United States Patent Office 3,215,629
Patented Nov. 2, 1965

3,215,629
BEARING COMPOSITIONS
Richard Weber, Oberursel, Heinrich Ziesler, Offenbach (Main), and Wilhelm Wurth, Frankfurt am Main, Sossenheim, Germany, assignors to Metallgesellschaft Aktiengesellschaft, Frankfurt, Germany
No Drawing. Filed July 9, 1962, Ser. No. 208,580
Claims priority, application Germany, July 8, 1961, M 49,844; Nov. 14, 1961, M 50,867; Apr. 18, 1962, M 52,559; Apr. 19, 1962, M 52,578; Apr. 21, 1962, M 52,607
5 Claims. (Cl. 252—12)

The present invention relates to bearings or other bodies subjected to sliding forces, more particularly, to such bearings or bodies formed from a polyamide having a metal mixed therewith.

Polyamides having suitable metals mixed therewith have been employed as bearing surfaces in many forms of bearings and in machine parts subjected to sliding movement with respect to a co-operating part. Examples of such bearing surfaces are bearings for levers, tie rods in motor vehicles, or as bearings of moveable components in measuring instruments.

For satisfactory operation such bearing surfaces must have a high wear-resistance, a low static or starting friction which is of particular importance in measuring instruments, a low kinetic or sliding friction, and the composition of the bearing surface must have a good adhesive strength. Also, a bearing surface must have good adhesive strength when used as a bearing lining similar to that of a babbitt bearing. In addition, the absorption of moisture must be relatively insignificant because of the danger that the absorbed moisture would expand the material of the bearing surface so as to vary the clearance between the bearing surface and the body journalled thereon.

Bodies which are subjected to sliding movement upon another body have been manufactured from polyamides having metallic and/or non-metallic constituents mixed therewith. It has been previously proposed to mix lead, copper, or iron with a polyamide to form such a bearing surface.

While such bearing surfaces have been generally satisfactory, it has been desired to form such polyamide bearing surfaces having even less static and kinetic friction and having a high resistance to wear.

It is therefore the principal object of the present invention to provide a novel and improved bearing surface formed of a polyamide.

It is a further object of the present invention to provide an improved bearing surface consisting of a polyamide having a metal mixed therewith.

It has now been found that improved bearing surfaces can be obtained by mixing definite quantities of cadmium, tin, aluminum, or lead with a polyamide.

One polyamide which has proved very suitable as a bearing surface when mixed with one of the aforementioned metals is polyamide 11, having the trade name Rilsan being a polymerization product of 11 aminoundecanoic acid. The mixing of the metal and a polyamide is carried out in a conventional and well-known manner, such as disclosed in the U.S. Patent 2,695,425.

Tests have shown that when from 8 to 35% by volume and preferably from 10 to 25% by volume of cadmium is added to the polyamide, the bearing properties of the polyamide are considerably improved. The wear of such a polyamide can be reduced virtually to zero. In addition, the mixture of Rilsan and cadmium as disclosed in the present invention proved to have a very high adhesive strength when being used as a composition.

When a body has a bearing surface comprising a polyamide, such as polyamide 11 (Rilsan), to which tin has been added, the resulting bearing surface has very low static and kinetic friction. In addition, such a bearing surface has excellent wearing qualities and has a very satisfactory adhesive strength such as when the bearing surface is adhering to a bearing shell. Generally speaking, the best bearing properties of a bearing surface comprising a polyamide and tin are obtained when from 8 to 35% by volume of tin and preferably from 10 to 25% by volume of tin is mixed with a polyamide.

The mixture of aluminum to a polyamide, such as polyamide 11, also results in a bearing surface having very low static and kinetic friction together with very good wearing properties. Such a bearing surface also has extremely good adhesive strength.

When aluminum is mixed with a polyamide, the best all-round bearing properties are obtained when the aluminum content ranges from 8 to 35% by volume and preferably from 10 to 25% by volume.

The bearing properties of the polyamide bearing surface are considerably improved by the addition of from 5 to 20% by volume of lead and preferably from 10 to 15% by volume of lead by a polyamide. A mixture of lead with a polyamide is particularly useful in that it produces a high wear-resistant bearing surface which has improved heat conductivity but whose bearing properties are not impaired as compared with bearing surfaces of pure polyamides. Generally speaking, the mixing of lead with a polyamide renders the bearing surface more suitable for practical use.

When lead is mixed with a polyamide to form a bearing surface, the bearing surface can be improved by adding from 0.2 to 2% by volume of molybdenum disulfide, and preferably 0.5 to 1% by volume, in addition to the lead content.

While many different polyamides are suitable for the fabrication of bearing surfaces, it has been found that Rilsan or polyamide 11, is the most suitable.

It has further been found that the lead mixed with a polyamide need not be limited to 20% by volume but may be as much as 35% by volume. The operating properties of a bearing surface containing this higher proportion of lead, such as the static and kinetic friction, the operating time and the resistance to wear, are not substantially decreased as compared with polyamides to which less than 20% by volume of lead was mixed. Further increasing the lead content to about 50% by volume will decrease the operating properties of the bearing surface and will also decrease the adhesive strength which is desired when the bearing surface is used as a bearing lining similar to that of babbitt bearings. Thus, the bearing surfaces comprising a mixture of a polyamide and about 50% by volume of lead are not generally satisfactory.

Either the entire bearing or only the bearing lining, such as that employed in a babbitt bearing may be formed of the compositions of Rilsan and metals discussed above. These compositions may not only be used for bearing shells formed of steel and having contours, such as ridges, thereon but also for bearing shells formed of other metals such as copper or aluminum alloys. Such bearings may be operated either with a lubricant or in a dry condition.

The bearing properties and the resistance to wear of the bearing surfaces described above can be improved by heat-treating the bearing surface in an oil bath at temperatures ranging from 100 to 200° C. This oil bath may be carried out at atmospheric pressure at a temperature of 150° C. for a period of 24 hours.

In making the bearing surface of the present invention, the cadmium, tin, aluminum or lead in a powdered form is thoroughly mixed with a powdered polyamide, said powdered polyamide comprising a moulding powder polycondensation product of 11 aminoundecanoic acid having a melting point of 189° C. and a specific gravity of 1.04. The powdered mixture can then be deposited on the bearing shell according to known sintering processes. The powdered mixture of a polyamide and a metal can also be deposited upon a preheated bearing shell. The ultimate thickness of the bearing layer is preferably from 0.2 to 0.5 mm.

Under certain circumstances, the bearing shell may be formed of such a material that the bearing surface will not readily adhere to the shell. In such instances, an intermediate layer of bronze can be applied in a known manner to the supporting shell, such as of steel. Such intermediate layers can be applied by any one of many known processes, such as by galvanizing, plating, spraying, or casting. The intermediate layer, which acts as a primer for the bearing surface, may be composed of other metals or plastics.

In order to increase the low capacity of the bearing surface, the resistance to wear, and to improve the conductivity, a supporting frame may be embedded in the bearing surface. For such a purpose, a copper bearing alloy formed into a porous metal or a wire net is embedded into the bearing surface. It is also possible to utilize sheets having a suitably profiled surface with depressions or recesses therein for collecting and retaining the plastic. Such re-inforced bearing surfaces can be used in both solid bearings and in lined bearings, such as babbitt bearings.

In order to assist in the comprehension of the present invention, several specific examples are provided which are for illustrative purposes only and do not limit the invention in any way.

*Example I*

A bearing surface composed of Rilsan and cadmium, according to the present invention, was tested under the following conditions:
Sliding speed _____m./sec__ 1
Specific load _____kg./cm.²__ 24
Operation time _____hours__ 8
Countermaterial—steel having a hardness of C 45, and the following composition:
  Carbon _____percent__ 0.45
  Silicon _____do____ 0.25
  Manganese _____do____ 0.65
  Phosphorus _____percent max__ 0.45
  Sulfur _____do____ 0.45
Dry operation of bearing surface.

The following results were obtained for bearing surfaces having different cadmium content as shown in the following table:

|  | Cadmium, percent by vol. | Coefficient of starting friction, μ | Coefficient of moving friction, μ | Wear, mm.³/hr. | Adhesive, strength, kg./mm.² |
|---|---|---|---|---|---|
| Rilsan plus cadmium. | 8 | 0.05 | 0.2 | 0.05 | 4.4 |
|  | 25 | 0.05 | 0.25 | 0 | 4.2 |
|  | 35 | 0.05 | 0.18 | 0 | 2.2 |

The kinetic or moving friction was found to be greater than the starting friction due to the temperature rise between bearing surface and the steel countermaterial during the sliding movement of the bearing surface thereon. This temperature and the values of friction for both static and kinetic conditions are borne out by test data.

*Example II*

A bearing surface composed of Rilsan and tin, according to the present invention, was tested under the same conditions of Example I.

The following results were obtained for bearing surfaces of different tin content as shown in the following table:

|  | Tin, percent by vol. | Coefficient of starting friction, μ | Coefficient of moving friction, μ | Wear, mm.³/hr. | Adhesive, strength, kg./mm.² |
|---|---|---|---|---|---|
| Rilsan plus tin. | 8 | 0.10 | 0.35 | 0.99 | 4.8 |
|  | 25 | 0.09 | 0.35 | 0.79 | 4.8 |
|  | 35 | 0.10 | 0.35 | 0.99 | 4.4 |

*Example III*

A bearing surface composed of Rilsan and aluminum, according to this invention, was tested under the same conditions as in Example I.

The following results for bearing surfaces of different aluminum content were obtained:

|  | Aluminum, percent by vol. | Coefficient of starting friction, μ | Coefficient of moving friction, μ | Wear, mm.³/hr. | Adhesive, strength, kg./mm.² |
|---|---|---|---|---|---|
| Rislan plus aluminum. | 8 | 0.06 | 0.24 | 1.02 | 5.6 |
|  | 15 | 0.07 | 0.28 | 1.05 | 5.5 |
|  | 35 | 0.10 | 0.28 | 0.68 | 4.0 |

*Example IV*

A bearing surface composed of Rilsan and lead, according to the invention, was tested under the same conditions as in Example I.

The following results for bearing surfaces of different lead content were obtained:

|  | Lead, percent by vol. | Coefficient of starting friction, μ | Coefficient of moving friction, μ | Wear, mm.³/hr. | Adhesive, strength, kg./mm.² |
|---|---|---|---|---|---|
| Rilsan plus lead. | 0 | 0.07 | 0.35 | 0.54 | 4.6 |
|  | 1 | 0.12 | 0.38 | 1.98 | 3.7 |
|  | 5 | 0.12 | 0.32 | 0.55 | 3.1 |
|  | 10 | 0.13 | 0.26 | 0.019 | 3.5 |
|  | 15 | 0.12 | 0.21 | 0.013 | 3.1 |
|  | 30 | 0.11 | 0.28 | 0.36 | 2.7 |
|  | 50 | 0.19 | 0.37 | 6.13 | 1.7 |

It will be understood that this invention is susceptible to modification in order to adapt it to different usages and conditions, and, accordingly, it is desired to comprehend such modifications within this invention as may fall within the scope of the appended claims.

What is claimed is:

1. An antifriction bearing comprising a sintered mixture of a powdered metallic additive with a powdered polycondensation product of 11 aminoundecanoic acid, said powdered metallic additive selected from the group consisting of 8 to 35% by volume cadmium, 8 to 35% by volume tin, 8 to 35% by volume aluminum, and 5 to 35% by volume lead.

2. An antifriction bearing comprising a sintered mixture of a powdered metallic additive with a powdered polycondensation product of 11 aminoundecanoic acid, said powdered metallic additive comprising 8 to 35% by volume cadmium.

3. An antifriction bearing comprising a sintered mixture of a powdered metallic additive with a powdered polycondensation product of 11 aminoundecanoic acid, said metallic additive comprising 8 to 35% by volume tin.

4. An antifriction bearing comprising a sintered mixture of a powdered metallic additive with a powdered polycondensation product of 11 aminoundecanoic acid, said metallic additive comprising 8 to 35% by volume aluminum.

5. An antifriction bearing comprising a sintered mixture of a powdered metallic additive with a powdered polycondensation product of 11 aminoundecanoic acid, said metallic additive comprising 5 to 35% by volume lead.

References Cited by the Examiner

UNITED STATES PATENTS

| | | | |
|---|---|---|---|
| 1,714,564 | 5/29 | Koehler | 252—12 |
| 1,847,796 | 3/32 | Thurston | 252—26 |
| 2,695,425 | 11/54 | Stott | 18—47.5 |
| 2,838,436 | 6/58 | Clingman | 156—93 |
| 2,995,462 | 8/61 | Mitchell et al. | 252—12 |

DANIEL E. WYMAN, *Primary Examiner.*

FRANK SUSKO, *Examiner.*